(12) United States Patent
Park et al.

(10) Patent No.: US 11,331,856 B2
(45) Date of Patent: May 17, 2022

(54) LINEAR LIGHT SOURCE USING ULTRAVIOLET LEDS, AND PHOTOPOLYMER 3D PRINTER COMPRISING LINEAR LIGHT SOURCE

(71) Applicant: KOREA ELECTRONICS TECHNOLOGY INSTITUTE, Seongnam-si (KR)

(72) Inventors: Jaehyoun Park, Suwon-si (KR); Yonggon Seo, Seongnam-si (KR); Jinkoog Shin, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 225 days.

(21) Appl. No.: 16/446,521

(22) Filed: Jun. 19, 2019

(65) Prior Publication Data

US 2019/0299531 A1   Oct. 3, 2019

Related U.S. Application Data

(63) Continuation of application No. PCT/KR2017/012637, filed on Nov. 9, 2017.

(30) Foreign Application Priority Data

Dec. 28, 2016   (KR) .................. 10-2016-0180840

(51) Int. Cl.
*B29C 64/277*   (2017.01)
*G02B 27/09*   (2006.01)
(Continued)

(52) U.S. Cl.
CPC .......... *B29C 64/277* (2017.08); *B29C 64/129* (2017.08); *B29C 64/282* (2017.08);
(Continued)

(58) Field of Classification Search
CPC ... B29C 64/264; B29C 64/268; B29C 64/277; B29C 71/04; B29C 64/129;
(Continued)

(56) References Cited

U.S. PATENT DOCUMENTS 5,664,251 A  *  9/1997  Tachihara .............. B41J 3/4073
                                                                       396/548
2010/0140849 A1*  6/2010  Comb ................... B29C 64/118
                                                                      264/401

(Continued)

FOREIGN PATENT DOCUMENTS

KR         10-1406900 B1      6/2014
KR     10-2016-0112482 A      9/2016
(Continued)

OTHER PUBLICATIONS

Office Action of corresponding Korean Patent Application No. 10-2016-0180840—5 pages (dated Feb. 9, 2018).
(Continued)

*Primary Examiner* — Philip C Tucker
*Assistant Examiner* — Jimmy R Smith, Jr.
(74) *Attorney, Agent, or Firm* — Knobbe Martens Olson & Bear LLP

(57) ABSTRACT

The present application relates to a linear light source using ultraviolet light emitting diodes (LEDs), and a photopolymer 3D printer comprising the linear light source. The linear light source may include a substrate distanced from a polymer case of the photopolymer 3D printer and an ultraviolet LED array in which a plurality of ultraviolet LEDs, which project ultraviolet rays toward the polymer case, are arranged on the substrate in multiple rows in the X-axis direction. The arrangement of the multiple columns in the Y-axis direction is at an oblique angle to the multiple rows.

10 Claims, 7 Drawing Sheets

(51) Int. Cl.
  *B29C 64/282* (2017.01)
  *B29C 64/286* (2017.01)
  *B33Y 30/00* (2015.01)
  *G02B 30/52* (2020.01)
  *G02B 27/18* (2006.01)
  *B29C 64/393* (2017.01)
  *B29C 64/129* (2017.01)
  *B33Y 40/00* (2020.01)
  *B29C 35/08* (2006.01)
  *B29C 64/291* (2017.01)

(52) U.S. Cl.
  CPC .......... *B29C 64/286* (2017.08); *B29C 64/393* (2017.08); *B33Y 30/00* (2014.12); *B33Y 40/00* (2014.12); *G02B 27/0922* (2013.01); *G02B 27/0988* (2013.01); *G02B 27/18* (2013.01); *G02B 30/52* (2020.01); *B29C 64/291* (2017.08); *B29C 2035/0827* (2013.01)

(58) Field of Classification Search
  CPC ................ B29C 64/282; B29C 64/291; B29C 2035/0827; B29C 2045/0075; B29C 33/06; B29C 35/0805; B29C 64/135; B29C 64/273; B29C 64/286; G02B 27/0916; G02B 27/0922; G02B 27/18; G02B 30/00; G02B 30/50; G02B 30/52
  See application file for complete search history.

(56) References Cited

U.S. PATENT DOCUMENTS

| | | | |
|---|---|---|---|
| 2012/0200791 A1 | 8/2012 | Lo | |
| 2014/0271328 A1* | 9/2014 | Burris | B23K 26/127 419/53 |
| 2016/0144570 A1* | 5/2016 | Kim | B29C 64/129 425/174.4 |
| 2017/0045666 A1* | 2/2017 | Vasylyev | G02B 6/0018 |
| 2017/0230528 A1* | 8/2017 | Colagrande | H04N 1/02845 |
| 2018/0056589 A1* | 3/2018 | Kim | B29C 64/393 |

FOREIGN PATENT DOCUMENTS

| | | | | |
|---|---|---|---|---|
| KR | 10-2016-0113063 A | | 9/2016 | |
| KR | 20160112482 A | * | 9/2016 | ............. B33Y 30/00 |
| KR | 10-2016-0127950 A | | 11/2016 | |
| WO | 2016/063231 A1 | | 4/2016 | |
| WO | 2018/124457 A1 | | 7/2018 | |

OTHER PUBLICATIONS

International Search Report of corresponding PCT Application No. PCT/KR2017/012637—4 pages (dated Jan. 18, 2018).

\* cited by examiner

LINEAR LIGHT SOURCE USING ULTRAVIOLET LEDS, AND PHOTOPOLYMER 3D PRINTER COMPRISING LINEAR LIGHT SOURCE

CROSS-REFERENCE TO RELATED APPLICATIONS

Any and all priority claims identified in the Application Data Sheet, or any correction thereto, are hereby incorporated by reference under 37 CFR 1.57. For example, this application is a continuation application, and claims the benefit under 35 U.S.C. § 120 and § 365 of PCT Application No. PCT/KR2017/012637 filed on Nov. 9, 2017, which is hereby incorporated by reference. PCT/KR2017/012637 also claimed priority from Korean Patent Application No. 10-2016-0180840 filed on Dec. 28, 2016 which is hereby incorporated by reference.

BACKGROUND

Field

The present disclosure relates to a 3D printer. More particularly, the present disclosure relates to a linear light source, using ultraviolet light emitting diodes (LEDs), for linearly projecting ultraviolet rays while sequentially moving an ultraviolet LED array and thereby curing a photopolymer in accordance with a printing form, and also relates to a photopolymerization 3D printer including the linear light source.

Description of the Related Technology

Photopolymerization printers use in general a digital light processing (DLP) technique or a stereo-lithography (SLA) technique.

The DLP technique uses a beam projector that projects light onto a liquid-state photopolymer so that the photopolymer is cured and stacked in a desired shape. This technique has advantages of excellent printing precision, excellent surface roughness, and a relatively fast producing speed for small productions. However, this technique has disadvantages of a need to expensive equipment and a limit to scale-up. Further, this technique is dependent on semiconductor companies that provide DLP solutions, thus having limitations in technique expansion.

The SLA technique is to project a laser onto a photopolymer contained in a tank so that the photopolymer is cured and stacked. A 3D printout can be obtained by moving along the Z axis to provide the next stacking position whenever a layered printout and a support for supporting this are stacked. This technique has also advantages of excellent printing precision and excellent surface roughness. However, this technique has disadvantages of a need to expensive equipment, a limit to scale-up, and a slow producing speed.

Therefore, there is a need for a photopolymerization 3D printer capable of providing improvements in equipment price, scale-up, and producing speed.

SUMMARY

One aspect is a linear light source using ultraviolet LEDs and a photopolymerization 3D printer including the same, wherein an ultraviolet LED array thereof has both a linear arrangement in an X-axis direction and a quasi linear arrangement in a Y-axis direction which forms an oblique angle with the arrangement in the X-axis direction, thereby projecting a desired printing pattern linearly.

Another aspect is a linear light source using ultraviolet LEDs and a photopolymerization 3D printer including the same, wherein an optical device is provided on a light-emitting surface of each ultraviolet LED.

Another aspect is a linear light source using ultraviolet LEDs and a photopolymerization 3D printer including the same, wherein the photopolymerization 3D printer is capable of producing one layer through only one scanning process in the Y-axis direction.

Another aspect is a linear light source using ultraviolet LED that includes a substrate disposed to be spaced apart from a photopolymer tank of photopolymerization 3D printer; and an ultraviolet LED array formed of a plurality of ultraviolet LEDs disposed on the substrate to project ultraviolet light toward the photopolymer tank, the plurality of ultraviolet LEDs being arranged to form a plurality of rows in an X-axis direction and arranged to form a plurality of columns in a Y-axis direction while having at an oblique angle (θ) with the rows.

In addition, the ultraviolet LED array may generate a beam spot through an optical device provided on a light-emitting surface of each ultraviolet LED.

In addition, the optical device may include an optical fiber, an optical lens, or a shadow mask and reduces a size of the beam spot.

In addition, in the ultraviolet LED array, a number (N) of the ultraviolet LEDs arranged in the Y-axis direction and the oblique angle (θ) may be determined according to a length (L) of one side of the ultraviolet LED and a spot size (d) of the beam spot.

In addition, in the ultraviolet LED array, the oblique angle (θ) may be determined by Equation below:

$$\theta = \tan^{-1} N, N = \frac{L}{d}. \qquad \text{[Equation]}$$

Another aspect is a photopolymerization 3D printer that includes a photopolymer tank accommodating a photopolymer to be used for producing a sculpture; a linear light source disposed to be spaced apart from one side of the photopolymer tank and projecting ultraviolet light toward the photopolymer tank; a linear light source transfer unit combined with the linear light source and moving the linear light source in a Y-axis direction; a bed disposed toward another side of the photopolymer tank and allowing the sculpture obtained from the photopolymer cured by the linear light source to be placed; a bed transfer unit combined with the bed and moving the bed in a Z-axis direction; and a control unit controlling operations of the linear light source, the linear light source transfer unit, and the bed transfer unit. The linear light source includes a substrate electrically connected to the control unit, and an ultraviolet LED array formed of a plurality of ultraviolet LEDs disposed on the substrate to project ultraviolet light, the plurality of ultraviolet LEDs being arranged to form a plurality of rows in an X-axis direction and arranged to form a plurality of columns in the Y-axis direction while having at an oblique angle (θ) with the rows.

In addition, the control unit may control the linear light source to cure the photopolymer in a linear shape while moving the linear light source in the Y-axis direction through the linear light source transfer unit.

In addition, the photopolymer tank may not exist in a region where a linear pattern is incompletely formed when the linear light source projects the ultraviolet light only to a part of the photopolymer in the X-axis direction.

In addition, the control unit may control the linear light source transfer unit to be stopped while the linear light source cures the photopolymer, and further control the linear light source transfer unit to transfer the linear light source in the Y-axis direction by a spot size of the ultraviolet LED when a curing process is completed.

In addition, based on both an X-axis address signal containing power voltage supply information for the ultraviolet LEDs and a Y-axis address signal containing plane image information for each layer of the sculpture, the control unit may control the ultraviolet LEDs to be turned on or off.

According to at least one of the disclosed embodiments, a linear light source using ultraviolet LEDs and a photopolymerization 3D printer including the same can project a desired printing pattern linearly by including an ultraviolet LED array that has both a linear arrangement in an X-axis direction and a quasi linear arrangement in a Y-axis direction which forms an oblique angle with the arrangement in the X-axis direction.

In addition, it is possible to reduce a beam spot of ultraviolet light to be projected on a photopolymer and thereby increase the printing precision by including an optical device provided on a light-emitting surface of each ultraviolet LED.

In addition, it is possible to increase a producing speed by producing one layer through only one scanning process in the Y-axis direction.

DETAILED DESCRIPTION

Figure 1:
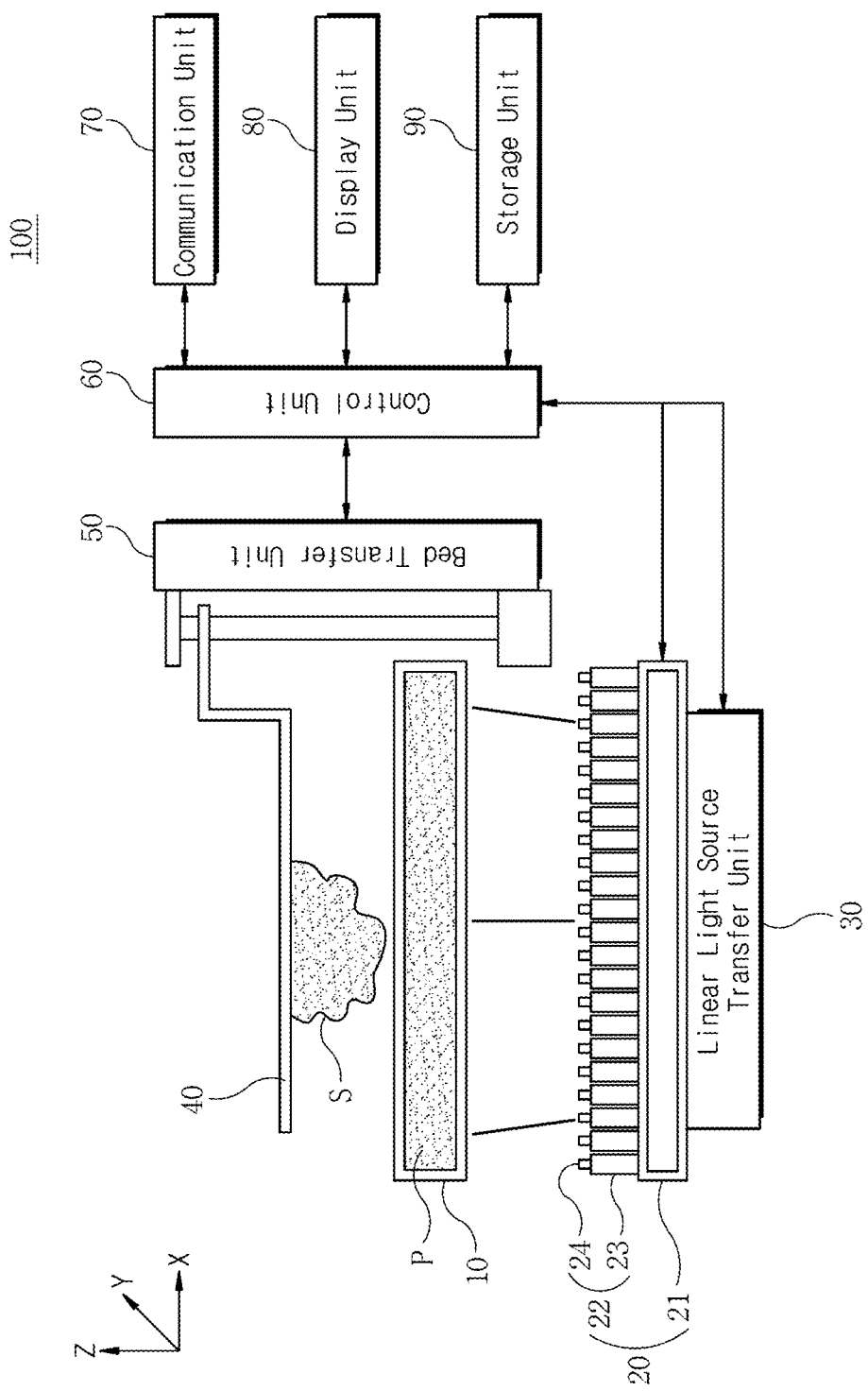
FIG. 1 is a diagram illustrating a photopolymerization 3D printer according to some embodiments.

Hereinafter, embodiments of the present invention will be described in detail with reference to the accompanying drawings. In the drawings, the same reference numerals as used to denote the same elements. In the following, detailed descriptions of known structures or functions, which are obvious to a person skilled in the art or may obscure the subject matter of the invention, will be omitted.

FIG. 1 is a diagram illustrating a photopolymerization 3D printer according to some embodiments.

Referring to FIG. 1, the photopolymerization 3D printer 100 includes an ultraviolet LED array that has both a linear arrangement in the X-axis direction and a quasi linear arrangement in the Y-axis direction which forms an oblique angle with the arrangement in the X-axis direction, thereby projecting a desired printing pattern linearly. In addition, the photopolymerization 3D printer 100 includes an optical device provided on a light-emitting surface of the ultraviolet LED array to reduce a beam spot of ultraviolet light to be projected on a photopolymer, thereby increasing the printing precision. Further, the photopolymerization 3D printer 100 is capable of producing one layer through only one scanning process in the Y-axis direction, thereby increasing a producing speed. The photopolymerization 3D printer 100 includes a photopolymer tank 10, a linear light source 20, a linear light source transfer unit 30, a bed 40, a bed transfer unit 50, a control unit (or a controller) 60, a communication unit 70, a display unit 80, and a storage unit 90.

The photopolymer tank 10 accommodates a photopolymer P to be used for producing a desired sculpture S. The photopolymer P is a photo-curable liquid resin composition. Although not shown in the drawings, the photopolymer tank 10 may include therein a level sensor for detecting the top level of the photopolymer P.

The linear light source 20 is disposed to be spaced apart from one side of the photopolymer tank 10, and projects ultraviolet light toward the photopolymer tank 10. In particular, the linear light source 20 may be disposed in parallel with the bottom surface of the photopolymer P, so that the linear light source 20 can uniformly emit ultraviolet light to the photopolymer P. The linear light source 20 includes a substrate 21 and an ultraviolet LED array 22.

The substrate 21 provides a mechanical support and electrical connection for the linear light source 20. The substrate 21 may be formed of a well-known printed circuit board. In addition, a size of the substrate 21 is equal to or slightly larger than that of the photopolymer tank 10, so that it is possible to produce one layer by only one scanning process in the Y-axis direction. This is also advantageous to increasing a producing speed.

The ultraviolet LED array 22 is formed of a plurality of ultraviolet LEDs 23, which forms a predetermined array on the substrate 21 and project ultraviolet light toward the photopolymer tank. In the ultraviolet LED array 22, the plurality of ultraviolet LEDs 23 are arranged to form a plurality of rows in the X-axis direction and also arranged to form a plurality of columns in the Y-axis direction while having at an oblique angle (θ) with such rows. That is, in the ultraviolet LED array 22, the ultraviolet LEDs 23 have a linear arrangement in the X-axis direction and have a quasi linear arrangement in the Y-axis direction. The ultraviolet LED array 22 generates a beam spot through an optical device 24, such as an optical lens or a shadow mask, provided on a light-emitting surface of each ultraviolet LED 23 in order to increase the printing precision. That is, using a beam spot having a reduced spot size, the ultraviolet LED array 22 can achieve the printing precision desired by a user. The ultraviolet LED array 22 is electrically connected to the control unit 60. Meanwhile, the ultraviolet LED 23 may be replaced with a surface-emitting semiconductor light source such as a VCSEL which is a laser diode.

The linear light source transfer unit 30 is combined with the linear light source 20 and moves the linear light source 20 in the Y-axis direction. The linear light source transfer unit 30 may include a motor, preferably, a step motor to precisely control a travel distance. The linear light source transfer unit 30 is electrically connected to the control unit 60.

The bed 40 is disposed toward another side of the photopolymer tank 10. The sculpture S obtained from the photopolymer P cured by the linear light source 20 is placed on the bed 40. For the placement of the sculpture S, the bed 40 may be movable into the photopolymer tank 10.

The bed transfer unit 50 is combined with the bed 40 and moves the bed 40 in the Z-axis direction. The bed transfer unit 50 includes a motor and is electrically connected to the control unit 60.

The control unit 60 controls the operations of the linear light source 20, the linear light source transfer unit 30, and the bed transfer unit 40. Specifically, the control unit 60 assigns an X-axis address and a Y-axis address to each of the ultraviolet LEDs 23 of the ultraviolet LED array 22 included in the linear light source 20, and controls the turn-on/off of each ultraviolet LED 23 by using an address signal corresponding to the X-axis and Y-axis addresses and also using an image signal. In addition, the control unit 60 controls the linear light source 20 to cure the photopolymer P in a linear shape while moving the linear light source 20 in the Y-axis direction through the linear light source transfer unit 30. In addition, the control unit 60 controls the linear light source transfer unit 30 to be stopped while the linear light source 20 cures the photopolymer P, and also controls the linear light source transfer unit 30 to transfer the linear light source 20 in the Y-axis direction by the spot size of the ultraviolet LED 23 when the curing process is completed. Further, the control unit 60 controls the bed conveyance unit 50 to transfer the bed 40 in the Z-axis direction when one layer is completely produced through the Y-axis scanning of the linear light source 20.

The communication unit 70 is electrically connected to the control unit 60, and performs wired/wireless communication with an external device (not shown). Preferably, the communication unit 70 is capable of performing wireless communication. The communication unit 70 may receive a user input from the external device, and this user input may be production information about the sculpture S.

The display unit 80 is electrically connected to the control unit 60, and visually displays a currently produced state of the sculpture S. In addition, the display unit 80 may include a touch screen function and directly receive a user input together with an input unit (not shown). The display unit 80 may include at least one of a liquid crystal display (LCD), a thin film transistor LCD (TFT LCD), an organic light-emitting diode (OLED), a flexible display, or a 3D display.

The storage unit 90 is electrically connected to the control unit 60, and stores production information about the sculpture S. Also, the storage unit 90 stores X-axis address information and Y-axis address information about each ultraviolet LED 23 of the linear light source 20. The storage unit 90 may include at least one of a flash memory, a hard disk, a multimedia card micro type memory, a card type memory (e.g., SD or XD memory), random access memory (RAM), a static RAM (SRAM), a read-only memory (ROM), a programmable ROM (PROM), an electrically erasable PROM (EEPROM), a magnetic memory, a magnetic disk, or an optical disk.

Figure 2:
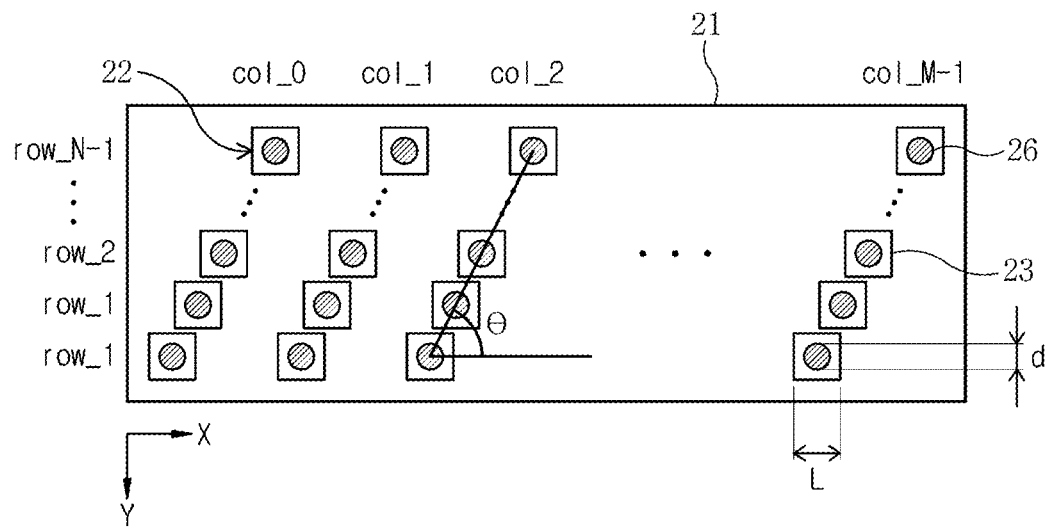
FIG. 2 is a diagram illustrating the arrangement of an ultraviolet LED array in a linear light source according to some embodiments.

FIG. 2 is a diagram illustrating the arrangement of an ultraviolet LED array in a linear light source according to some embodiments.

Referring to FIG. 2, the linear light source 20 includes the substrate 21 and the ultraviolet LED array 22.

When the linear light source 20 has a simple linear arrangement of the ultraviolet LED array, it is difficult to realize a photopolymerization 3D printer having a desired printing precision. Therefore, in the ultraviolet LED array 22, the ultraviolet LEDs 23 are not only arranged to form a plurality of rows in the X-axis direction, but also arranged to form a plurality of columns in the Y-axis direction while having at an oblique angle (θ) with such rows. That is, in the ultraviolet LED array 22, the ultraviolet LEDs 23 have a linear arrangement in the X-axis direction and have a quasi linear arrangement in the Y-axis direction. Thereby, the linear light source 20 can project the beam spot 25 of a desired printing precision on the photopolymer P in a linear pattern without any gap.

In the ultraviolet LED array 22, the number (N) of the ultraviolet LEDs 23 arranged in the Y-axis direction and the oblique angle (θ) are determined according to the length (L) of one side of the ultraviolet LED 23 and the spot size (d) of the beam spot 25. That is, the number (N) of the ultraviolet LEDs 23 arranged in the Y-axis direction and the oblique angle (θ) are determined by the ratio of the size of the ultraviolet LED 23 to the printing precision.

For example, assuming that the printing precision, namely, the spot size (d), required by a user input is 100 μm, the length (L) of one side of the ultraviolet LED 23 is 1,000 μm, and a space between the ultraviolet LEDs 23 can be ignored, the ultraviolet LED array 22 should arrange ten ultraviolet LEDs 23 in the Y-axis direction with the oblique angle (θ) of arc tan (1,000×10/1,000). That is, using the spot size (d) and the length (L) of one side of the ultraviolet LED 23, the number (N) of the ultraviolet LEDs 23 with respect to the Y-axis direction and the oblique angle (θ) may be defined as Equation 1.

Equation 1

$$\theta = \tan^{-1} N, N = \frac{L}{d}$$

Here, θ denotes an angle of the ultraviolet LEDs 23 linearly arranged in the Y-axis direction, N denotes the number of the ultraviolet LEDs 23 linearly arranged in the Y-axis direction, L denotes the length of one side of the ultraviolet LED 23, and d denotes the spot size.

FIGS. 3 to 7 are diagrams illustrating an operation control of a linear light source according to some embodiments.

Referring to FIGS. 1 to 7, the control unit 60 controls the linear light source 20 to cure the photopolymer P in a linear shape while moving the linear light source 20 in the Y-axis direction through the linear light source transfer unit 30. In addition, the control unit 60 controls the linear light source transfer unit 30 to be stopped while the linear light source 20 cures the photopolymer P, and also controls the linear light source transfer unit 30 to transfer the linear light source 20 in the Y-axis direction by the spot size (d) of the ultraviolet LED 23 when the curing process is completed.

For example, the control unit 60 controls the linear light source 20 to be moved stepwise in the Y-axis direction by the spot size (d) to project the ultraviolet light onto the photopolymer P. Among circular-shaped light sources shown in FIGS. 3 to 7, dark circles 26 represent the light sources of currently projecting the ultraviolet light, and bright circles 27 represent the light sources of having already projected the ultraviolet light at previous steps.

Figure 3:
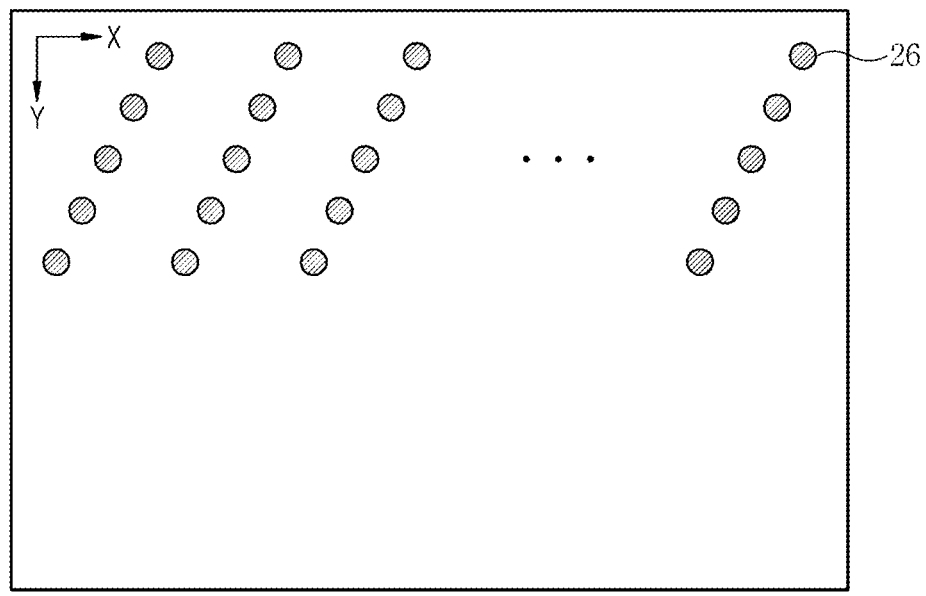
FIGS. 3 to 7 are diagrams illustrating an operation control of a linear light source according to some embodiments.
Figure 4:
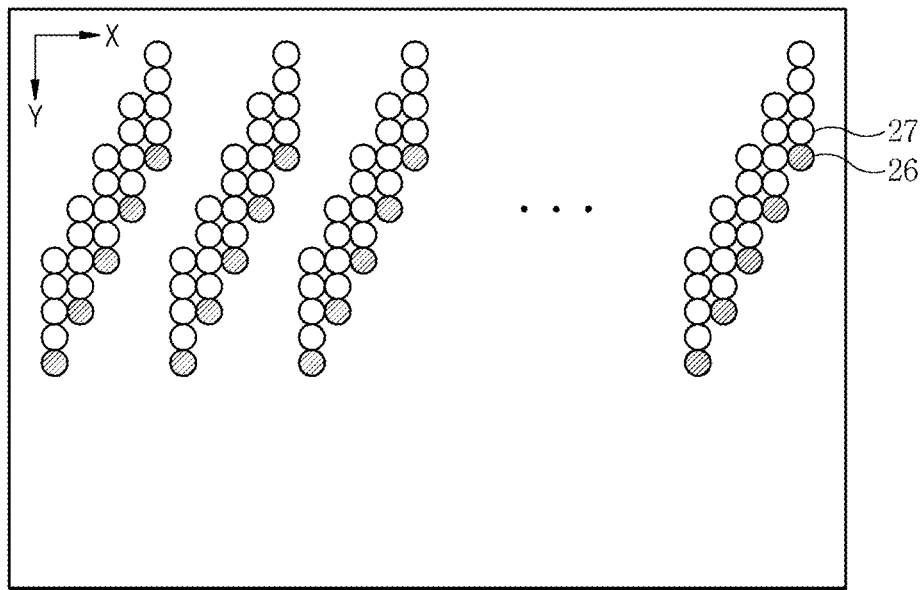
Figure 5:
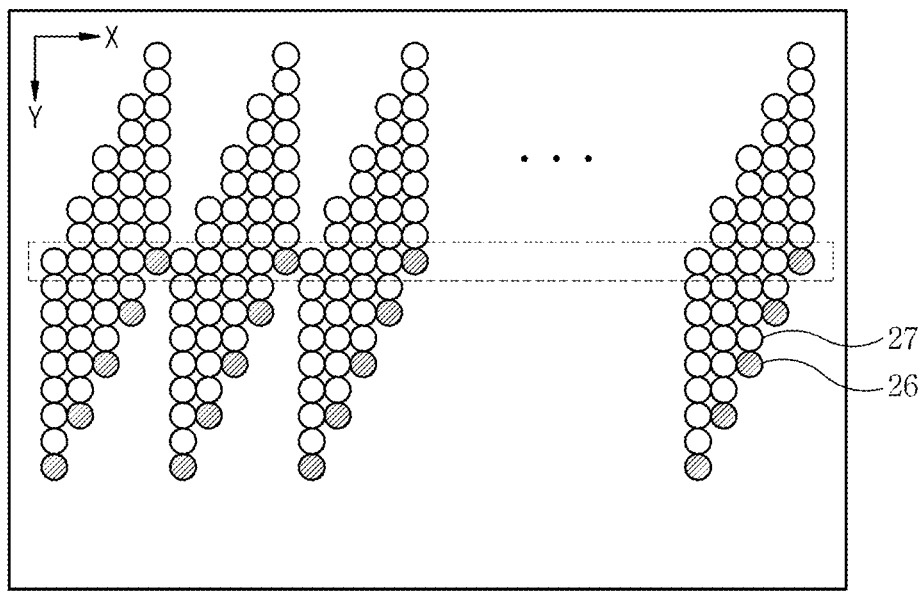
Figure 6:
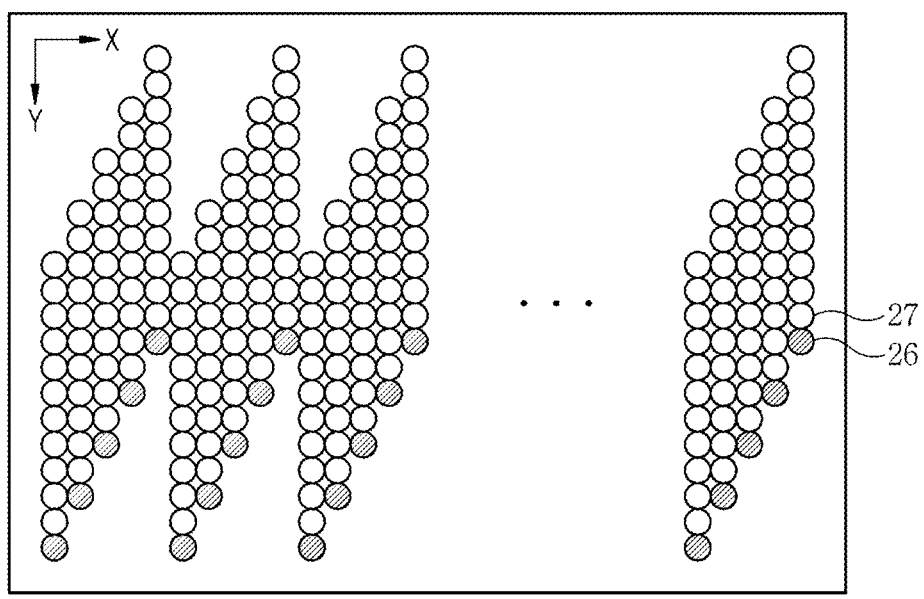

Meanwhile, FIG. 3 shows a projected pattern of the ultraviolet light at the initial position of the linear light source 20. In addition, FIG. 4 shows a projected pattern of the ultraviolet light obtained after the linear light source 20 moves at four steps in the Y-axis direction, and FIG. 5 shows a projected pattern of the ultraviolet light obtained after the linear light source 20 moves at N steps in the Y-axis direction. A dotted rectangle shown in FIG. 5 indicates a linear pattern initially completed on the photopolymer P in the X-axis direction. Also, FIG. 6 shows a projected linear pattern obtained through repetition of the above process, and FIG. 7 shows a final linear pattern obtained after FIG. 6.

Figure 7:
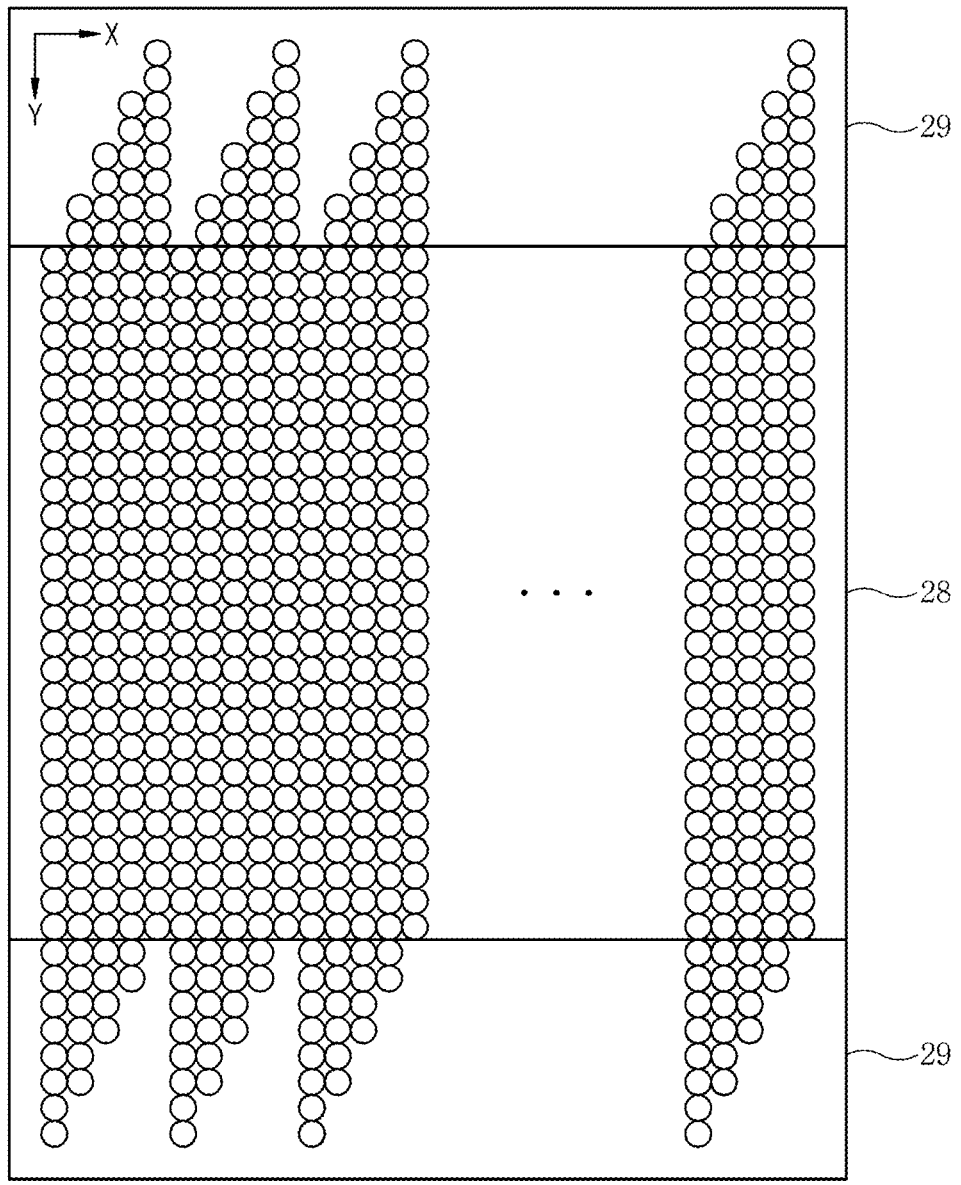

The final linear pattern shown in FIG. 7 may be divided into two zones, namely, an active zone 28 and a dead zone 29. The active zone 28 indicates a region where the linear pattern initially completed in the X-axis direction as shown in FIG. 5 is also completed in the Y-axis direction by a desired area. The dead zone 29 is a region where the projection of the ultraviolet light is not made completely in the X-axis direction because the ultraviolet LED array 22 of the linear light source 20 has a quasi linear arrangement of an oblique angle (θ).

Therefore, it is necessary that the photopolymer P of the dead zone 29 is not actually projected. Simply, it is possible to exclude the photopolymer P from the dead zone 29. That is, the photopolymer tank 10 may not exist in a region where a linear pattern is incompletely formed because the linear light source 20 projects the ultraviolet light only to a part of the photopolymer P in the X-axis direction.

The area of the dead zone 29 is determined by the Y-axis direction length of the linear process. That is, the larger the printing resolution and the larger the size of the ultraviolet LED 23, the wider the area.

Figure 8:
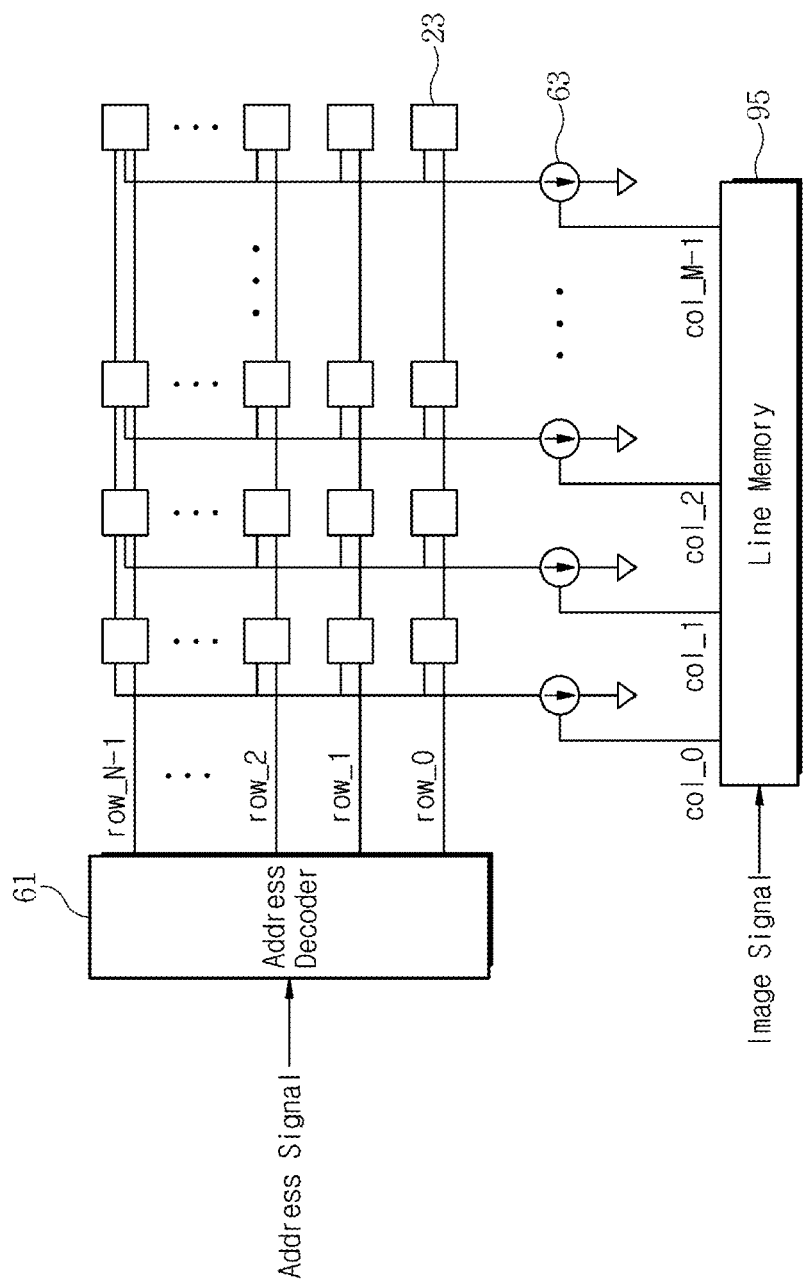
FIG. 8 is a diagram illustrating a driving circuit of a linear light source according to some embodiments.

FIG. 8 is a diagram illustrating a driving circuit of a linear light source according to some embodiments.

Referring to FIGS. 1 and 8, in the linear light source 20, the respective ultraviolet LEDs 23 of the ultraviolet LED array 22 are individually turned on or off. That is, based on both an X-axis address signal containing power voltage supply information for the ultraviolet LEDs 23 and a Y-axis address signal containing plane image information for each layer of the sculpture S, the control unit 60 is capable of controlling the ultraviolet LEDs 23 to be turned on or off. For this, the driving circuit of the linear light source 20 including the ultraviolet LED array 22 is connected to an address decoder 61 and a constant current regulator 63 included in the control unit 60, and a line memory 95 included in the storage unit 90.

Specifically, through the address decoder 61, the X-axis address signals (row_0 to row_N−1) are connected to anodes of the ultraviolet LEDs 23 in each row. Also, through the line memory 95 that stores image signals (image data), the Y-axis address signals (col_0 to col_N−1) are connected, as a control input, to the constant current regulator 63 commonly connected to cathodes of the ultraviolet LEDs 23 in each column. The X-axis address signal supplies a power voltage to the ultraviolet LEDs 23 in a desired row, and the Y-axis address signal turns on or off the constant current regulator 63 in a corresponding column. That is, the Y-axis address signal determines whether to project the ultraviolet light to a corresponding portion of the photopolymer P.

Figure 9:
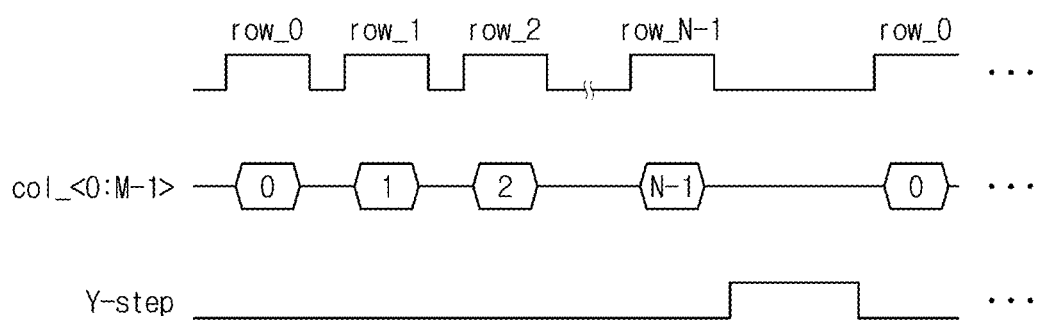
FIG. 9 is a diagram illustrating a control signal for driving a linear light source according to some embodiments.

FIG. 9 is a diagram illustrating a control signal for driving a linear light source according to some embodiments.

Referring to FIGS. 1, 8 and 9, the control unit 60 not only controls an XY-axes address function, but also controls the Y-axis image signal based on the X-axis address signal in order to efficiently drive the ultraviolet LEDs 23.

In a state where the address signal row_i is turned on to select a desired row, the control unit 60 controls the ultraviolet LED 23 by applying the image signal col_<0:M−1>. In this way, the control unit 60 enables one constant current regulator 63 to always drive only one ultraviolet LED 23. This allows the ultraviolet LEDs 23 to be always driven with the constant current. It is therefore possible to obtain the consistent light output and also increase the efficiency.

By controlling the turn-on time of row_i, that is, the minimum duration of the image signal col_<0:M−1> which is the output of the line memory 95, the control unit 60 sets up a curing time of the photopolymer P by a beam spot. The curing time may be set up according to the characteristics of the photopolymer P and the projection output of the ultraviolet light.

After completing the above-described process for all the rows in the linear light source 20, the control unit 60 controls, through a Y-step signal, the linear light source transfer unit 30 to be moved in the Y-axis direction by the spot size.

While this disclosure has been particularly shown and described with reference to an exemplary embodiment thereof, it will be understood by those skilled in the art that various changes in form and details may be made therein without departing from the scope of the present invention as defined by the appended claims.

What is claimed is:

1. A linear light source using ultraviolet light emitting diodes (LEDs), comprising:
a substrate disposed to be spaced apart from a photopolymer tank of a photopolymerization 3D printer; and
an ultraviolet LED array comprising a plurality of ultraviolet LEDs disposed on the substrate to project ultraviolet light toward the photopolymer tank, each of the plurality of ultraviolet LEDs of the ultraviolet LED array being configured to generate a beam spot; and
an optical lens or shadow mask provided on a light-emitting surface of each ultraviolet LED and configured to reduce a spot size of the beam spot,
the ultraviolet LED array being configured to move with respect to the photopolymer tank in a Y-axis direction such that each of the plurality of ultraviolet LEDs is configured to move on one of a plurality of trajectory lines extending along the Y-axis direction, the plurality of ultraviolet LEDs being arranged to form a plurality of rows in an X-axis direction and arranged to form a plurality of columns in an oblique direction having an oblique angle (θ) with respect to the X-axis direction and having another oblique angle with respect to the Y-axis direction such that the beam spot of only one of the plurality of ultraviolet LEDs is arranged on and configured to move along each of the plurality of trajectory lines,
wherein each of the plurality of ultraviolet LEDs has an X-axis direction length and a Y-axis direction length, and wherein each adjacent pair of ultraviolet LEDs located in the same column among the plurality of ultraviolet LEDs partially overlap each other when viewed in the Y-axis direction, while each adjacent pair of the ultraviolet LEDs are separated with a gap when viewed in the X-axis direction, such that the linear light source is configured to project the beam spots of the plurality of ultraviolet LEDs, each adjacent pair of the projected beam spots directly contacting each other in the X-axis direction and each adjacent pair of the projected beam spots directly contacting each other in the Y-axis direction.

2. The linear light source of claim 1, wherein in the ultraviolet LED array, the oblique angle (θ) is determined by Equation below:

$$\theta = \tan^{-1} N, N = \frac{L}{d}, \qquad \text{[Equation]}$$

wherein L is the Y-axis direction length of each of the plurality of ultraviolet LEDs and d is the spot size of the beam spot.

3. The linear light source of claim 1, wherein each trajectory line of each of the plurality of ultraviolet LEDs does not overlap any of the other ultraviolet LEDs among the plurality of ultraviolet LEDs.

4. The linear light source of claim 1, wherein two or more ultraviolet LEDs among the plurality of ultraviolet LEDs are arranged on each of the rows extending in the X-axis direction while only one of the plurality of ultraviolet LEDs is arranged on each of the plurality of trajectory lines extending in the Y-axis direction.

5. The linear light source of claim 1, wherein the columns of the plurality of ultraviolet LEDs comprise a first column and a second column immediately neighboring the first column, wherein each of the first column and the second column comprises a first end ultraviolet LED and a second end ultraviolet LED, and wherein the trajectory line of the first end ultraviolet LED of the first column immediately neighbors the trajectory line of the second end ultraviolet LED of the second column.

6. A photopolymerization 3D printer comprising:
a photopolymer tank accommodating a photopolymer configured to produce a sculpture;
a linear light source disposed to be spaced apart from one side of the photopolymer tank and configured to project ultraviolet light toward the photopolymer tank, the linear light source being configured to move in a Y-axis direction;
a bed disposed toward another side of the photopolymer tank and configured to allow the sculpture obtained from the photopolymer cured by the linear light source to be placed, the bed being configured to move in a Z-axis direction; and
a controller configured to control an operation of the linear light source, and movements of the linear light source and the bed,
wherein the linear light source includes:
a substrate electrically connected to the controller;
an ultraviolet LED array comprising a plurality of ultraviolet LEDs disposed on the substrate to project ultraviolet light, each of the plurality of ultraviolet LEDs of the ultraviolet LED array being configured to generate a beam spot; and
an optical lens or shadow mask provided on a light-emitting surface of each ultraviolet LED and configured to reduce a spot size of the beam spot,
the ultraviolet LED array being configured to move with respect to the photopolymer tank in the Y-axis direction such that each of the plurality of ultraviolet LEDs is configured to move on one of a plurality of trajectory lines extending along the Y-axis direction, the plurality of ultraviolet LEDs being arranged to form a plurality of rows in an X-axis direction and arranged to form a plurality of columns in an oblique direction having an oblique angle (θ) with respect to the X-axis direction and having another oblique angle with respect to the Y-axis direction such that the beam spot of only one of the plurality of ultraviolet LEDs is arranged on and configured to move along each of the plurality of trajectory lines,
wherein each of the plurality of ultraviolet LEDs has an X-axis direction length and a Y-axis direction length, and wherein each adjacent pair of ultraviolet LEDs located in the same column among the plurality of ultraviolet LEDs partially overlap each other when viewed in the Y-axis direction, while each adjacent pair of the ultraviolet LEDs are separated with a gap when viewed in the X-axis direction, such that the linear light source is configured to project the beam spots of the plurality of ultraviolet LEDs, each adjacent pair of the projected beam spots directly contacting each other in the X-axis direction and each adjacent pair of the projected beam spots directly contacting each other in the Y-axis direction.

7. The photopolymerization 3D printer of claim 6, wherein the controller is configured to control the linear light source to cure the photopolymer in a linear shape while moving the linear light source in the Y-axis direction through the linear light source.

8. The photopolymerization 3D printer of claim 7, wherein the ultraviolet LED array is configured to move between a first position and a second position, and wherein at least some of the plurality of ultraviolet LEDs do not overlap the photopolymer in the Z-axis direction when the ultraviolet LED array is positioned in the first position or the second position.

9. The photopolymerization 3D printer of claim 6, wherein the controller is configured to control the linear light source to be stopped while the linear light source cures the photopolymer, and further configured to control the linear light source to move in the Y-axis direction by a spot size of each of the plurality of ultraviolet LEDs when a curing process is completed.

10. The photopolymerization 3D printer of claim 6, wherein based on both an X-axis address signal containing power voltage supply information for the ultraviolet LEDs and a Y-axis address signal containing plane image information for the sculpture, the controller is configured to control the ultraviolet LEDs to be turned on or off.

* * * * *